United States Patent [19]

Braemer

[11] 4,256,466

[45] Mar. 17, 1981

[54] PROCESS FOR OFF-GAS RECOVERY

[75] Inventor: Frank C. Braemer, Teaneck, N.J.

[73] Assignee: Envirotech Corporation, Menlo Park, Calif.

[21] Appl. No.: 57,625

[22] Filed: Jul. 16, 1979

[51] Int. Cl.³ .............................................. C10K 3/00
[52] U.S. Cl. .................................... 48/197 R; 75/60; 252/373; 423/415 A
[58] Field of Search ....................... 48/197R; 252/373; 75/60; 423/415 A

[56] References Cited

U.S. PATENT DOCUMENTS

| 2,007,586 | 7/1935 | Stalhane et al. | 423/415 A |
| 3,118,759 | 1/1964 | Okaniwa et al. | 75/60 |
| 3,143,142 | 8/1964 | Okaniwa et al. | 48/197 R |
| 3,615,355 | 10/1971 | Skinner et al. | 75/60 |
| 4,040,976 | 8/1977 | Greene | 423/415 A |

FOREIGN PATENT DOCUMENTS 872088  7/1961  United Kingdom ................. 48/197 R Primary Examiner—Peter F. Kratz
Attorney, Agent, or Firm—Robert E. Krebs; Thomas S. MacDonald

[57] ABSTRACT

Disclosed is a process provided for increasing the fuel value of off-gas (20) recovered from oxygen blowing steel converters (10, 100). Carbon is introduced into an off-gas capture hood (22) to react with carbon dioxide therein to form carbon monoxide. A carbon dioxide curtain (61) is formed which surrounds the inlet end of the gas capture device (22) to prevent air from entering the capture device. Carbon dioxide is drawn from the carbon dioxide curtain (61) into the capture device (22) to mix with the gases therein.

17 Claims, 3 Drawing Figures

PROCESS FOR OFF-GAS RECOVERY

BACKGROUND OF THE INVENTION

1. Field of the Invention

The present invention relates generally to the capture of gases emitted from furnaces and more particularly to ways and means for increasing the fuel value of off-gas recovered from oxygen blowing steel converters.

2. State of the Art

In a well-known process for making steel, a stream of oxygen gas is contacted with molten ferrous metal contained in a steel converter vessel. The oxygen reacts with carbon contained in the molten metal. The reaction generates an off-gas which comprises large quantities of carbon monoxide, a gas which has value both as a fuel and as a constituent in the manufacture of chemical products. The off-gas emitted from the converter vessel also contains amounts of carbon dioxide and other "impurities" that dilute the concentration of the carbon monoxide.

Because of the valuable carbon monoxide content of the off-gas but also because of its highly toxic and flammable nature, more recent technology captures the hot (2700° F.) off-gas emitted from the converter vessel in a suppressed combustion type system. The off-gas captured by the suppressed combustion system is then cooled and cleansed of dust particles. The cooled, cleaned gases are either combusted and discharged to the atmosphere or recovered for subsequent use.

A typical suppressed combustion system involves several stages. At the beginning of the oxygen blowing process, an off-gas capture device is positioned above the opening at the top of the converter vessel. Shortly after oxygen blowing begins, the carbon content of the molten metal reacts violently with the blown oxygen and "ignition" occurs.

As oxygen blowing in the converter vessel proceeds, the volume and carbon monoxide content of the off-gas increases. At this occurs, an exothermic reaction between the carbon monoxide and the oxygen contained in the outside air entering the capture device causes the temperature of the gases passing through the device to increase substantially. Although the capture device is typically indirectly cooled by liquid or steam, the heat generated by the reaction of carbon monoxide and oxygen and the resultant increased gas volumes would eventually exceed the design capability of the device if the reaction were allowed to proceed unchecked. Thus, the amount of air entering the capture device is controllably reduced. Combustion of carbon monoxide is thus suppressed and the heat release in the device is maintained at a relatively low level.

For the first few minutes after suppressed combustion has begun, the volume of carbon monoxide emitted from the converter vessel remains too low to make its recovery economically attractive. Usually during this stage, the partially-combusted off-gas captured by the capture device is cooled, cleaned and delivered to a flare stack for complete combustion and discharge to the atmosphere.

When the volume of carbon monoxide contained in the off-gas reaches a point at which it is economically attractive to recover the off-gas in an uncombusted state, flow of the captured off-gas is redirected from the flare stack to a gas holder for recovery. During this stage of the off-gas recovery procedure, a minimum amount (approximately 10%, for example) of the stoichiometric amount of air required for complete combustion of the carbon monoxide to carbon dioxide is drawn into the capture device by an induced draft fan. This amount of air is allowed to enter the system to insure that the toxic, inflammable and dust-laden off-gas does not escape and enter the work area surrounding the converter vessel. Thus, during this stage of the off-gas recovery procedure, about 90% of the available carbon monoxide emitted from the converter vessel is recovered for further use.

As the oxygen blowing process comes to an end, i.e., as the carbon content of the molten metal charge in the converter vessel becomes depleted, the carbon monoxide content of the off-gas decreases. When the carbon monoxide content falls below a point at which recovery is economically worthwhile, gas recovery to the holder is terminated and greater quantities of air are again allowed to enter the capture device. As in the first stage of blowing, the oxygen in the air reacts with the hot carbon monoxide contained in the off-gas to form carbon dioxide. The gases leaving the capture device are cooled, cleaned and discharged to the atmosphere through the flare stack.

As stated above, because it is necessary to air-ventilate the capture device, at best only about 90% of the available carbon monoxide is recovered during the recovery stage of an oxygen blowing process. In addition to causing the combustion of 10% of the available carbon monoxide to carbon dioxide, air introduced for ventilation purposes also introduces nitrogen and other gases to the recovered off-gas to further dilute the carbon monoxide content.

Efforts have been made to reduce or eliminate the requirement for air ventilation of the capture device. For example, either carbon dioxide or nitrogen has been utilized to form an inert gas curtain which surrounds the gap between the converter vessel opening and the inlet of the capture device. The carbon dioxide or nitrogen curtain prevents air from entering the capture device through the gap. Ventilation of the device is maintained by drawing a portion of the carbon dioxide or nitrogen from the curtain, through the gap and into the device. While this procedure substantially eliminates premature combustion of carbon monoxide by reaction with air, it introduces additional carbon dioxide or nitrogen into the capture device to further dilute the carbon monoxide content of the recovered off-gas.

OBJECTS AND SUMMARY OF THE INVENTION

It is an object of the present invention to provide ways and means for increasing the fuel value of gases recovered from oxygen blowing steel converters.

It is a further object of the present invention to provide ways and means for increasing the volume of carbon monoxide which can be recovered from oxygen blowing steel converters beyond that available solely through capture of the off-gas emitted from the converter vessel.

It is a further object of the present invention to provide ways and means for preventing the premature combustion of carbon monoxide recovered from oxygen blowing steel converters.

The present invention achieves the foregoing objects by providing a system and process for recovering off-gas from steel converter vessels wherein carbon is introduced to the off-gas recovery system to react with carbon dioxide in the system to form additional carbon monoxide. Carbon dioxide may be utilized to form a gas curtain which surrounds the mouth of the converter vessel. Preferably, the carbon dioxide utilized to form the curtain is stripped from previously-recovered gases. The carbon dioxide curtain prevents air from entering the recovery system and prematurely reacting with the captured carbon monoxide. Carbon dioxide is drawn into the recovery system from the carbon dioxide curtain and reacts with the introduced carbon therein.

As a modification of the process according to the present invention, steam may also be added to the recovery system to react with carbon monoxide to form hydrogen and carbon dioxide. The hydrogen formed in the steam reaction essentially replaces the fuel value of the carbon monoxide lost in the reaction. The carbon dioxide formed in the steam reaction is subsequently stripped from the recovered off-gas and utilized to form the carbon dioxide curtain surrounding the mouth of the converter vessel.

The system and process of the present invention provide numerous advantages over the prior art. The volume of the recovered combustible gases is increased by using the sensible heat of the off-gas emitted from the converter vessel to provide heat for the reaction of carbon dioxide with carbon to form additional carbon monoxide. By utilizing a carbon dioxide curtain, the total fuel value of the captured off-gas emitted from the converter vessel is retained because premature combustion of carbon monoxide is eliminated. Introduction of carbon dioxide from the curtain surrounding the mouth of the converter provides carbon dioxide for reaction with carbon. Thus, by recovering off-gas according to the present invention, the total fuel value of the recovered gases is increased beyond the value available solely through capture of the off-gas emitted from the converter vessel.

BRIEF DESCRIPTION OF THE DRAWINGS

FIG. 3 is a schematic drawing of a bottom-blowing oxygen steel converter vessel and of capture hood 22.

DETAILED DESCRIPTION OF THE PREFERRED EMBODIMENT

Figure 1:
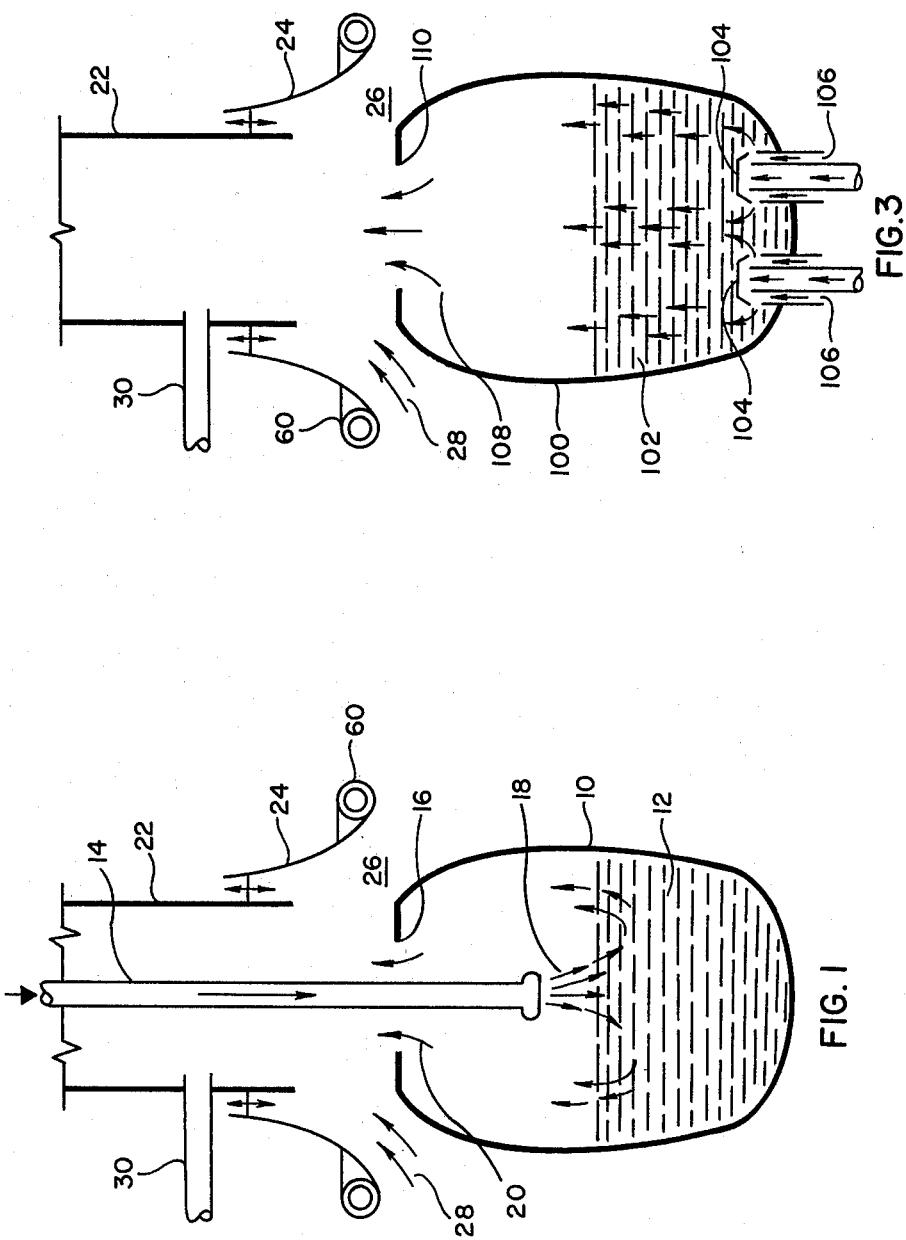
FIG. 1 is a schematic drawing of a top-blowing oxygen steel converter vessel and of capture hood 22.

FIG. 1 shows one type of suppressed combustion system wherein an oxygen steel converter vessel 10 contains a charge 12 of molten ferrous metal. An oxygen lance 14 extends downwardly into converter vessel 10 through an opening 16 formed therein. An oxygen-rich gas stream 18, which generally comprises pure oxygen, passes downwardly through lance 14. The gas stream 18 discharging from lance 14 reacts with carbon which is dissolved or entrained in the molten metal charge 12 to generate an off-gas stream 20 which is high in carbon monoxide (CO) content. The off-gas stream 20 also contains amounts of carbon dioxide ($CO_2$) and traces of other compounds.

The relative concentrations of the off-gas constituents varies during the several stages of the oxygen blowing procedure. Generally, the off-gas stream 20 will contain primarily CO. During the "peak of blow", the CO concentration of the off-gas can approach 100%. However, during the initial and final stages of the blowing procedure, the CO concentration of off-gas stream 20 is significantly lower.

Returning now to FIG. 1, off-gas stream 20 is emitted from converter vessel 10 through opening 16 and is drawn into a steam or liquid-cooled off-gas capture hood 22 by a draft inducing means, an example of which is described below. Capture hood 22 includes a vertically-adjustable skirt 24 which is mounted above opening 16. A gap 26 exists between the opening 16 and the lower edge of skirt 24. Gap 26 allows a ventilation gas stream 28 to enter capture hood 22. Because skirt 24 is vertically adjustable, it can be raised or lowered relative to opening 16 to increase or decrease the size of the gap 26 between the lower edge of skirt 24 and opening 16. In this manner, the amount of ventilation gas entering capture hood 22 may be controlled.

A carbon feeder 30 in communication with the interior of capture hood 22, preferably at the inlet of hood 22, serves to introduce free carbon or carbon-containing material to the off-gas stream passing through the hood. It should be understood that the carbon feeder 30 is schematically shown in FIG. 1 and can be any one of a number of commercially available devices such as, for example, a rotary feeder. The carbon so introduced reacts with $CO_2$ contained in the hot (2700° F.) off-gas stream to form CO according to the following reaction:

$$C + CO_2 \rightarrow 2CO - 70{,}200 \text{ BTU}/\#\text{Mole C reacted} \qquad (a)$$

It is believed that waste carbon with little or no commercial value, such as kish or coke breeze, from other processes in the steel mill would be sufficiently reactive to provide a source of carbon for the above reaction (a).

Figure 2:
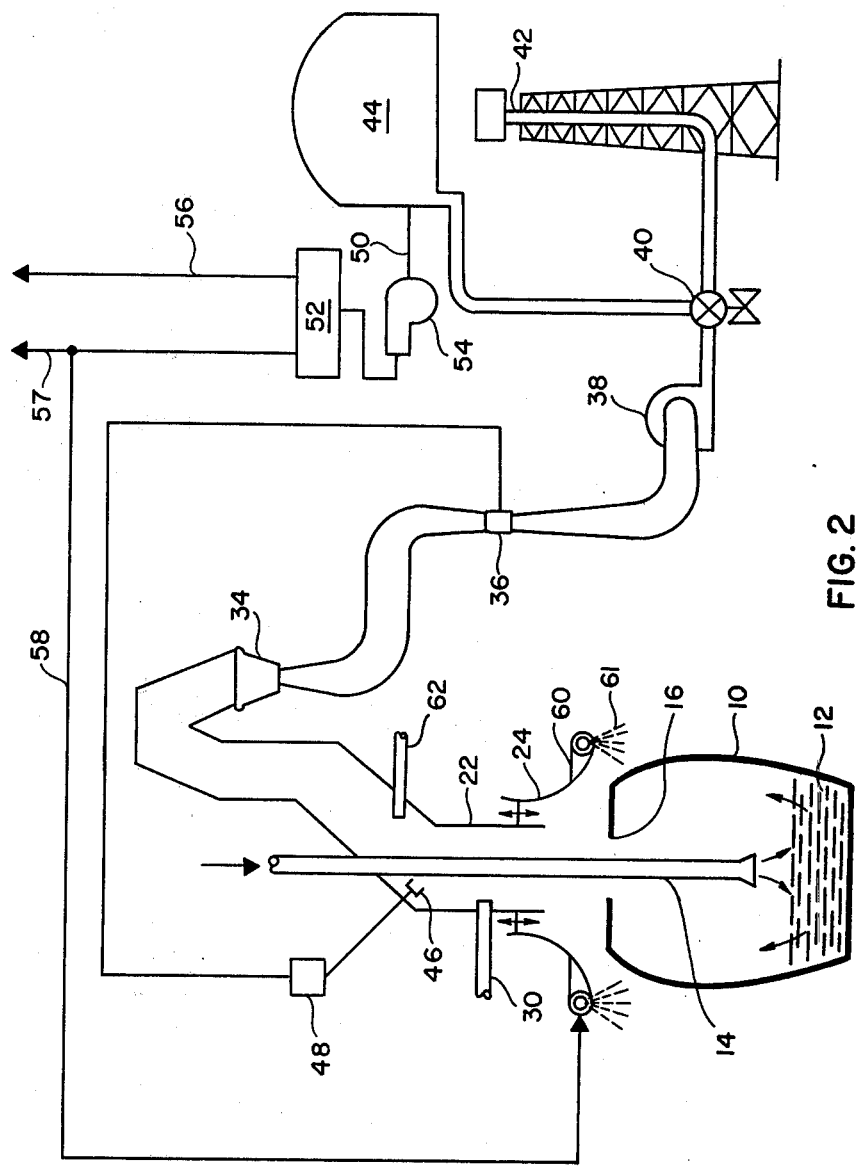
FIG. 2 is a schematic drawing of the present invention.

As shown in FIG. 2, the captured off-gas leaving capture hood 22 passes through a cleaning device 34 which cleans particulate matter from the cooled gases, a gas flow control device 36 which serves to regulate the pressure within capture hood 22, a draft-inducing device 38 which creates a negative pressure within capture hood 22 such that the off-gas discharged from converter vessel 10 is drawn into the capture hood 22 and a three-way valve 40 which directs the captured off-gas either to a flare stack 42 for combustion and discharge to the atmosphere or to recovery. In the illustrated embodiment, recovered gases are retained in a gas holder 44.

A pressure control means is utilized to maintain the pressure within the capture hood 22 at a value sufficient to controllably draw the desired volume of ventilation gas into the hood. In the embodiment illustrated in FIG. 2, a pressure sensor 46 monitors the pressure within capture hood 22. The pressure detected by sensor 46 is compared with a predetermined set point pressure value established by a pressure control device 48. Based on the signal received from sensor 46, pressure control device 48 activates gas flow control device 36 to maintain the pressure in capture hood 22 at the set point value.

Connected to gas holder 44 via conduit 50 is a $CO_2$ stripper 52. A gas pumping device 54 located in conduit 50 withdraws recovered off-gas from gas holder 44 and delivers these gases to the stripper 52. The stripper 52 removes $CO_2$ from the off-gas by any of a number of commercial methods well known in the chemical industry such as, for example, by the hot potassium carbonate method. The gases from which $CO_2$ has been removed, now high in CO purity, are delivered via line 56 for use as fuel or as a constituent in the production of other chemical products.

The $CO_2$ which has been removed from the off-gas by the $CO_2$ stripper 52 is either discharged via line 57 or is available to be delivered via return line 58 to an annular gas header pipe 60 attached to the skirt 24 of capture hood 22. Header pipe 60 is operable to discharge $CO_2$ downwardly to form a $CO_2$ curtain 61 which surrounds the opening 16 of converter vessel 10 to seal the gap 26 between the opening 16 and the lower edge of skirt 24 so that air cannot pass through the gap 26 to enter capture hood 22.

A steam line 62 communicates with the interior of capture hood 22, preferably at a point in the capture hood 22 downstream from the carbon feeder 30. Steam, which could include wet steam, may be controllably introduced to the capture hood 22 to react with CO in the captured off-gas to form hydrogen and $CO_2$ according to the following reaction:

$$CO + H_2O \rightarrow CO_2 + H_2 - 700 \text{ BTU/\#Mole} \quad (b)$$

The fuel value of the captured off-gas is not affected by the above reaction (b) since the $H_2$ formed in the reaction essentially compensates for the loss of CO. At the same time, the $CO_2$ which is generated by the reaction (b) can be subsequently removed from the recovered gases by the $CO_2$ stripper 52 and, if desired, utilized to form the $CO_2$ curtain surrounding the opening 16 of the converter vessel 10.

The operation of the aforedescribed system will now be explained.

The oxygen blowing procedure is initiated with the vertically-adjustable skirt 24 in a raised position relative to the opening 16 in the converter vessel 10. In a very short time following commencement of oxygen blowing, ignition occurs and, due to the ingress of a sufficient volume of air, full combustion of the CO contained in the off-gas occurs within the capture hood 22.

Soon after ignition has been confirmed, the vertically-adjustable skirt 24 is lowered to reduce the size of the gap 26 between the opening 16 and the lower edge of skirt 24 and, thus, to reduce the amount of air entering capture hood 22. In this manner, combustion of CO to $CO_2$ is suppressed. For the first few minutes of the suppressed combustion stage of the oxygen blowing procedure, the off-gas emitted from opening 16 remains relatively low in CO content and, thus, is undesirable for recovery. During this stage, the captured off-gas is passed through cleaning device 34 and ultimately is discharged to the atmosphere through flare stack 42.

When the CO content in the off-gas leaving the capture hood 22 reaches the point at which it is desirable to recover the gases for subsequent use, valve 40 is repositioned such that the captured off-gas is delivered to gas holder 44 rather than discharged through flare stack 42. Thus, the off-gas recovery stage of the blowing procedure begins.

In addition to its valuable latent heat of combustion, the CO-rich off-gas emitted from converter vessel 10 also possesses a large amount of sensible heat by virtue of its temperature, normally about 2700° F. The major portion of this vast amount of sensible heat is usually lost from the off-gas when the temperature of the captured off-gas is lowered by indirect cooling in the capture hood 22.

According to the present invention, with the beginning of the off-gas recovery stage of the blowing procedure, carbon or carbon-bearing particles such as kish or coke breeze are introduced to the capture hood 22 through carbon feeder 30. The carbon so introduced reacts with $CO_2$ in the gases in the capture hood 22 to produce additional CO according to the following reaction:

$$C + CO_2 \rightarrow 2CO - 70,200 \text{ BTU/\#Mole C} \quad (c)$$

The heat required to support the above reaction (c) is provided by the sensible heat of the off-gas. As shown in Example 1 below, this additional CO production increases the fuel value of the recovered gases not only beyond that of the gases recovered at normal 10% partial combustion but also beyond that available from the CO contained in the off-gas originally emitted from the converter vessel 10.

EXAMPLE 1

Consider a conventional suppressed combustion off-gas capture process, that is, a process which does not utilize carbon addition, for a typical 250 ton converter vessel having a 25,000 SCFM $O_2$ blow rate. Assuming 100% conversion to CO at "peak of blow", such a system would result in 50,000 SCFM CO contained in the off-gas originally emitted from the converter vessel. The fuel value of this gas would be the following:

$$50,000 \frac{\text{Std. ft}^3}{\text{min.}} \cdot 321 \frac{\text{BTU}}{\text{Std. ft}^3} = 16.050 \times 10^6 \frac{\text{BTU}}{\text{min.}}$$

At 10% partial combustion, 11,900 SCFM air comprising 2500 SCFM $O_2$ and 9400 SCFM $N_2$ will be drawn into the capture hood. The following reaction will result:

$$50,000 \text{ CO} + 2500 \text{ O}_2 + 9400 \text{ N}_2 \longrightarrow$$
$$45,000 \text{ CO} + 5000 \text{ CO}_2 + 9400 \text{ N}_2$$

Thus, the fuel value of the off-gas recovered according to the conventional suppressed combustion method at "peak of blow" will be the following:

$$45,000 \frac{\text{Std. ft}^3}{\text{min.}} \cdot 321 \frac{\text{BTU}}{\text{Std. ft}^3} = 14.445 \times 10^6 \frac{\text{BTU}}{\text{min.}}$$

With the addition of sufficient carbon to the capture hood to convert all of the $CO_2$ formed due to partial combustion to CO, the following reaction will result:

$$45,000 \text{ CO} + 5000 \text{ CO}_2 + 9400 \text{ N}_2 + 158.3 \frac{\text{lbs.}}{\text{min.}} \text{ C} \longrightarrow$$
$$55,000 \text{ CO} + 9400 \text{ N}_2$$

Thus, the fuel value of gases recovered when carbon is added to a conventional suppressed combustion recovery system will be the following:

$$55,000 \frac{\text{Std. ft}^3}{\text{min.}} \cdot 321 \frac{\text{BTU}}{\text{Std. ft}^3} = 17.655 \times 10^6 \frac{\text{BTU}}{\text{min.}},$$

or a fuel value 22.2% greater than the fuel value of gases recovered according to the conventional suppressed combustion method and 10.0% greater than the fuel value of the off-gases originally emitted from the converter vessel.

Because of the endothermicity of the above reaction (c), the temperature of the off-gas passing through the capture hood 22 will be reduced substantially as the reaction proceeds. Ultimately the loss of temperature will cause the CO/CO$_2$ mixture to reach equilibrium at which point the reaction will cease.

It should be understood that the addition of carbon to capture hood 22 to react with CO$_2$ to form CO according to the above reaction (c) is not limited to circumstances of 10% partial combustion. Sufficient amounts of carbon may be added to capture hood 22 to react with CO$_2$ to form the desired volume of CO regardless of the volume of ventilation air that is allowed to enter the hood.

According to the preferred embodiment of the present invention, CO$_2$, and preferably CO$_2$ which has been stripped from previously recovered off-gas by CO$_2$ stripper 52, is delivered to header pipe 60. Header pipe 60 discharges CO$_2$ downwardly to form a CO$_2$ curtain 61 at the opening 16 of the converter vessel 10 such that air is prevented from entering the capture hood 22 through the gap 26. Thus, the air normally drawn into the capture hood 22 for ventilation purposes, regardless of its volume, is replaced by an equivalent volume of inert CO$_2$. The CO$_2$ utilized for this purpose can be heated; for example, the CO$_2$ could be heated to the temperature of the gases contained in the capture hood 22. As shown in Example 2 below, in those circumstances in which a volume of air equal to about 10% of the stoichiometric amount required for complete combustion of recovered CO is utilized for ventilation of the capture hood 22, use of the CO$_2$ curtain 61 further increases the CO content of the off-gas passing from capture hood 22 beyond that achieved solely by the addition of carbon.

EXAMPLE 2

Consider a conventional suppressed combustion off-gas capture process, that is, a process which utilizes neither carbon addition nor a CO$_2$ curtain, for a typical 250 ton converter having a 25,000 SCFM O$_2$ blow rate. Assuming 100% conversion to CO at "peak of blow", such a system would result in 50,000 SCFM CO contained in the off-gas originally emitted from the converter vessel. At 10% partial combustion, 11,900 SCFM air comprising 2500 SCFM O$_2$ and 9400 SCFM N$_2$ will be drawn into the capture hood. The following reaction will result:

50,000 CO + 2500 O$_2$ + 9400 N$_2$ → 45,000 CO + 5000 CO$_2$ + 9400 N$_2$

Thus, the fuel value of the off-gases recovered according to the conventional suppressed combustion method at "peak of blow" will be the following:

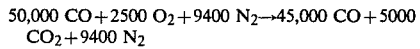

In the off-gas recovery system according to the present invention utilizing both carbon addition and a CO$_2$ curtain, a normal converter blow rate of 25,000 SCFM O$_2$ will again produce 50,000 SCFM CO at "peak of blow" (assuming 100% conversion to CO). However, rather than 11,900 SCFM air being drawn into the recovery hood for ventilation, 11,900 SCFM CO$_2$ from the inert CO$_2$ curtain will be drawn into the hood. By the introduction of carbon to the inlet of the recovery hood (gas temp.=2030° F.), the following reaction will occur:

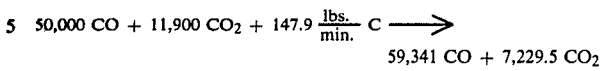

Thus, the fuel value of the off-gas recovered according to the process of the present invention utilizing both carbon addition and a CO$_2$ curtain at "peak of blow" will be the following:

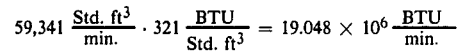

or a 31.9% increase over the conventional suppressed combustion recovery process.

As a modification of the preferred embodiment, while the CO$_2$ curtain 61 remains intact to prevent ventilation air from entering the capture hood 22 through gap 26, oxygen (O$_2$) is injected into the capture hood 22 to react exothermically with CO to create additional heat to improve the thermal driving force for the above reaction (c).

It is believed that the reaction of CO$_2$ to CO will cease at a point which leaves a sufficient amount of CO$_2$ available in the recovered gases to be stripped by stripper 52 and utilized to form the CO$_2$ curtain surrounding opening 16. However, should the amount of CO$_2$ available be insufficient to provide an adequate supply for the formation of the CO$_2$ curtain, then additional amounts of CO$_2$ can be formed by the addition of steam to the capture hood 22 through line 62. The steam so added will react with the CO in the capture hood according to the following reaction:

$$CO + H_2O \rightarrow H_2 + CO_2 - 700 \text{ BTU}/\#\text{Mole} \qquad (d)$$

The amount of steam added can be controlled to insure that a sufficient amount of CO$_2$ is available for formation of the CO$_2$ curtain. The fuel value of the recovered off-gas is unaffected by the steam addition, since the formation of H$_2$ essentially compensates for the loss of CO. Thus, the fuel value of the recovered gases will remain greater than that available solely through capture of the off-gas emitted from the converter vessel 10.

Further, the amount of steam added can be controlled to provide a specific composition of the ultimately recovered gases. For example, sufficient steam can be controllably introduced to the capture hood 22 to react with carbon monoxide to form hydrogen and carbon dioxide such that the ratio of hydrogen to carbon monoxide in the recovered gases is about 2:1. Recovered gases with such a hydrogen to CO ratio may be utilized in the subsequent manufacture of the valuable chemical methanol, preferably after CO$_2$ has been stripped from the recovered gases.

As the oxygen blowing procedure enters its final stage and the CO content of the off-gas decreases, the off-gas recovery process is terminated. That is, introduction of carbon to the capture hood ceases and the CO$_2$ curtain is eliminated so that air can again enter capture hood 22. As in the initial stage of the blowing procedure, the oxygen in the air reacts with a portion of the CO in the off-gas to form CO$_2$. The resulting gases pass through the gas cleaning system and by repositioning valve 40 are discharged to the atmosphere through flare stack 42.

While to this point, the discussion of the off-gas recovery process according to the present invention has focused on top-blowing oxygen steel converters and a particular type of suppressed combustion system, it is noted that the process described hereinabove is also applicable to converters of the bottom-blowing type and to all types of suppressed combustion systems.

For example, referring to FIG. 3, in bottom-blown converters, oxygen is introduced below a molten metal charge 102 contained in a converter vessel 100 through multiple tuyeres 104 mounted in the converter vessel 100. Either a liquid or a gaseous hydrocarbon, typically methane, is introduced through an annular space 106 surrounding each tuyere to prevent its "burn out". Because of the hydrocarbon addition, the off-gas stream 108 leaving the converter vessel 100 through opening 110 contains amounts of $H_2$ in addition to CO. In all other respects, the bottom-blowing process and the gases evolved during the bottom-blowing process parallel the top-blowing process. Thus, as shown in Example 3 below, the off-gas recovery process according to the present invention can be applied to bottom-blowing converters in the same manner as described above with respect to top-blowing converters with the resultant increase of the fuel value of the recovered gases beyond that available solely through capture of the off-gas emitted from the converter vessel.

EXAMPLE 3

Consider a conventional suppressed combustion off-gas capture process for a bottom blowing oxygen steel converter, that is, a process which utilizes neither carbon addition nor a $CO_2$ curtain, for a typical 250 ton normal converter having a 25,000 SCFM $O_2$ blow rate and 2700 SCFM $CH_4$ addition. Assuming 100% conversion to CO at "peak of blow", such a system would result in 50,000 SCFM CO and 5400 SCFM $H_2$ contained in the off-gas originally emitted from the converter vessel. At 10% partial combustion, 13,185 SCFM air comprising 2770 SCFM $O_2$ and 10,415 SCFM $N_2$ will be drawn into the capture hood. The following reaction will tend to occur:

50,000 CO + 5400 $H_2$ + 2770 $O_2$ + 10,415 $N_2$ → 44,810 CO + 5050 $H_2$ + 5190 $CO_2$ + 10,415 $N_2$ + 350 $H_2O$

Thus, the fuel value of the off-gas recovered from a bottom-blowing converter according to the conventional recovery method at "peak of blow" will be the following:

$$44{,}810 \frac{\text{Std. ft}^3}{\text{min.}} \cdot 321 \frac{\text{BTU}}{\text{Std. ft}^3 \text{CO}} +$$
$$5050 \frac{\text{Std. ft}^3}{\text{min.}} \cdot 321 \frac{\text{BTU}}{\text{Std. ft}^3 \text{H}_2} =$$
$$14.384 \times 10^6 \frac{\text{BTU}}{\text{min.}} + 1.621 \times 10^6 \frac{\text{BTU}}{\text{min.}} =$$
$$16.005 \times 10^6 \frac{\text{BTU}}{\text{min.}}$$

In the off-gas recovery system according to the present invention, utilizing both carbon addition and a $CO_2$ curtain, as applied to a bottom-blowing converter, a normal converter blow rate of 25,000 SCFM $O_2$ and 2700 SCFM $CH_4$ will again produce 50,000 SCFM CO and 5400 SCFM $H_2$ at "peak of blow" (assuming 100% conversion to CO). However, rather than 13,185 SCFM air being drawn into the recovery hood for ventilation, 13,185 SCFM $CO_2$ from the inert $CO_2$ curtain will be drawn into the hood. By the introduction of carbon to the inlet of the recovery hood (gas temp.=2030° F.), the following reaction will occur:

50,000 CO + 13,185 $CO_2$ + 5400 $H_2$ + 208.7 lbs./min. C → 60,396 CO + 7987 $CO_2$ + 5400 $H_2$ Thus, the fuel value of the off-gas recovered from a bottom-blowing converter according to the process of the present invention utilizing both carbon addition and a $CO_2$ curtain at "peak of blow" will be the following:

$$60{,}396 \frac{\text{Std. ft}^3}{\text{min.}} \cdot 321 \frac{\text{BTU}}{\text{Std. ft}^3 \text{CO}} +$$
$$5400 \frac{\text{Std. ft}^3}{\text{min.}} \cdot 321 \frac{\text{BTU}}{\text{Std. ft}^3 \text{H}_2} =$$
$$19.387 \times 10^6 \frac{\text{BTU}}{\text{min.}} + 1.733 \times 10^6 \frac{\text{BTU}}{\text{min.}} =$$
$$21.120 \times 10^6 \frac{\text{BTU}}{\text{min.}}$$

or a 32.0% increase over the conventional suppressed combustion process.

I claim:

1. A process for increasing the fuel value of gases containing carbon monoxide emitted from a furnace and captured by a gas capture device, comprising:
   a. forming a carbon dioxide curtain which surrounds the inlet of the gas capture device to prevent air from entering the capture device;
   b. drawing carbon dioxide from the carbon dioxide curtain into the capture device to mix with the gases therein; and
   c. introducing carbon into the capture device to react with carbon dioxide therein to form additional carbon monoxide.

2. The process of claim 1 wherein said carbon dioxide utilized to form said carbon dioxide curtain is stripped from previously captured gases.

3. The process of claim 1 wherein the temperature of said carbon dioxide utilized to form said carbon dioxide curtain is about the same as the temperature of the gases within the capture hood.

4. A process according to claim 1 further including injecting oxygen into the capture device.

5. A process according to claim 1 further including introducing steam to said capture device to react with carbon monoxide to form hydrogen and carbon dioxide.

6. The process of claim 5 wherein said steam is wet steam.

7. The process of claim 1 wherein said steam is introduced to said catpure device at a point downstream of the point of carbon introduction.

8. The process of claim 5 or 6 wherein a sufficient amount of steam is controllably introduced to said capture device to react with carbon monoxide to form hydrogen and carbon dioxide such that the ratio of hydrogen to carbon monoxide in the recovered gases is about 2:1.

9. The process of claim 1 wherein said furnace is an oxygen steel converter.

10. The process of claim 1 wherein said furnace is a top-blowing oxygen steel converter.

11. The process of claim 9 wherein said capture device is a suppressed combustion recovery system.

12. The process of claim 11 wherein said carbon is introduced at the inlet end of said suppressed combustion recovery system.

13. A process for increasing the fuel value of off-gas emitted from oxygen blowing steel converters of the type wherein oxygen is contacted with molten metal contained in a converter vessel and reacts with carbon dissolved or entrained in the molten metal to generate an off-gas containing carbon monoxide, said off-gas exiting the converter vessel through an opening formed in the vessel and entering the inlet end of an off-gas capture hood located above the opening such that a gap exists between the opening and the inlet end of the capture hood, comprising:
 a. introducing carbon into the capture hood to react with carbon dioxide in the hood to form additional carbon monoxide;
 b. stripping carbon dioxide from the captured off-gas;
 c. utilizing at least a portion of the carbon dioxide which has been stripped from the captured off-gas to form a carbon dioxide curtain surrounding the opening of the converter vessel to seal the gap between the opening and the inlet end of the off-gas capture hood so that air cannot pass through the gap to enter the capture hood; and
 d. drawing carbon dioxide from the carbon dioxide curtain into the capture hood to mix with the off-gas therein to provide carbon dioxide for reaction with the carbon introduced to the capture hood.

14. A process according to claim 13 further including injecting oxygen into the capture device.

15. A process according to claim 13 further including introducing steam to the capture hood to react with carbon monoxide to form hydrogen and carbon dioxide.

16. The process of claim 15 wherein said carbon is introduced at the inlet end of said capture hood.

17. The process of claim 15 wherein said converter vessel is a bottom-blowing oxygen steel converter.

* * * * *